United States Patent
Kimberg et al.

(10) Patent No.: US 10,380,587 B2
(45) Date of Patent: Aug. 13, 2019

(54) TRANSMITTING DISBURSEMENTS FROM A COMMERCIAL FINANCIAL ACCOUNT

(71) Applicant: MasterCard International Incorporated, Purchase, NY (US)

(72) Inventors: Deborah M. Kimberg, Chesterfield, MO (US); Shari Krikorian, Armonk, NY (US); Rodney A. Robinson, Los Altos Hills, CA (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 516 days.

(21) Appl. No.: 15/050,963

(22) Filed: Feb. 23, 2016

(65) Prior Publication Data

US 2016/0247134 A1    Aug. 25, 2016

Related U.S. Application Data

(60) Provisional application No. 62/119,636, filed on Feb. 23, 2015.

(51) Int. Cl.
*G06Q 40/00* (2012.01)
*G06Q 20/40* (2012.01)
(Continued)

(52) U.S. Cl.
CPC ......... *G06Q 20/401* (2013.01); *G06Q 20/102* (2013.01); *G06Q 20/403* (2013.01); *G06Q 20/4037* (2013.01); *G06Q 40/02* (2013.01)

(58) Field of Classification Search
CPC ............................ G06Q 20/102; G06Q 20/401
(Continued)

(56) References Cited

U.S. PATENT DOCUMENTS 7,225,155 B1    5/2007 Polk
7,356,505 B2    4/2008 March
(Continued)

FOREIGN PATENT DOCUMENTS

KR    10-2002-0028617 A    4/2002
KR    10-2009-0001910 A    1/2009

OTHER PUBLICATIONS

AHC debit protection offered. "Bank New Product News," 33. Retrieved from https://dialog.proquest.com/professional/docview/669411517?accountid=142257 (Year: 1991).*
(Continued)

*Primary Examiner* — Ojo O Oyebisi
(74) *Attorney, Agent, or Firm* — Armstrong Teasdale LLP

(57) ABSTRACT

A disbursement computing device for transmitting disbursements from a payor to a payee through a payment processing network is provided. The disbursement computing device is configured to receive a disbursement message including at least one disbursement payment instruction for transferring funds from a commercial disbursement financial account of a payor to a financial account of a payee. The disbursement computing device is also configured to automatically transmit, for each disbursement payment instruction, a purchase authorization request message to an issuer bank associated with the payor, and receive a payment authorization message from the issuer bank associated with the payor that the commercial disbursement financial account has a balance that is at least equal to a disbursement amount. The disbursement computing device is further configured to initiate a transfer of funds equal to the disbursement amount from the financial account of the payor to the financial account of the payee.

20 Claims, 9 Drawing Sheets

(51) Int. Cl.
*G06Q 20/10* (2012.01)
*G06Q 40/02* (2012.01)

(58) Field of Classification Search
USPC .......................................................... 705/40
See application file for complete search history.

(56) References Cited

U.S. PATENT DOCUMENTS

| | | |
|---|---|---|
| 8,175,968 B2 | 5/2012 | O'Leary et al. |
| 8,386,385 B2 | 2/2013 | Polk et al. |
| 8,616,453 B2 | 12/2013 | Itwaru |
| 2002/0016763 A1 | 2/2002 | March |
| 2002/0104878 A1 | 8/2002 | Seifert et al. |
| 2002/0184148 A1 | 12/2002 | Kahn et al. |
| 2005/0177510 A1 | 8/2005 | Hilt et al. |
| 2007/0125840 A1 | 6/2007 | Law et al. |
| 2007/0294168 A1 | 12/2007 | King |
| 2008/0210751 A1 | 9/2008 | Kim |
| 2009/0164330 A1* | 6/2009 | Bishop ................... G06Q 20/02 705/19 |
| 2010/0114724 A1 | 5/2010 | Ghosh et al. |
| 2010/0161486 A1 | 6/2010 | Liu et al. |
| 2010/0260388 A1 | 10/2010 | Garrett et al. |
| 2011/0238553 A1 | 9/2011 | Raj et al. |
| 2011/0270720 A1 | 11/2011 | Manohar |
| 2012/0191606 A1 | 7/2012 | Milne |
| 2012/0203632 A1 | 8/2012 | Blum et al. |
| 2013/0060689 A1 | 3/2013 | Oskolkov et al. |
| 2014/0074705 A1 | 3/2014 | Kimberg et al. |
| 2014/0108236 A1 | 4/2014 | Purves |
| 2014/0108249 A1 | 4/2014 | Kulpati et al. |
| 2014/0214675 A1 | 7/2014 | Sharma et al. |
| 2017/0300874 A1 | 10/2017 | Mao et al. |

OTHER PUBLICATIONS

PCT/US2016/019103 Written Opinion of the International Searching Authority dated Jun. 13, 2016 (7 pages).
Extended European Search Report, dated Jul. 25, 2018, for related EP patent application No. EP 16756176.0 (8 pgs).

* cited by examiner

TRANSMITTING DISBURSEMENTS FROM A COMMERCIAL FINANCIAL ACCOUNT

CROSS-REFERENCE TO RELATED APPLICATIONS

This application claims the benefit of priority to U.S. Provisional Patent Application Ser. No. 62/119,636, filed Feb. 23, 2015, entitled "TRANSMITTING DISBURSEMENTS FROM A COMMERCIAL FINANCIAL ACCOUNT," the entire contents and disclosure of which are hereby incorporated by reference in their entirety.

BACKGROUND

This disclosure relates to processing electronic signals associated with a payment network, and more specifically to transmitting funds from a commercial financial account as disbursements from a payor to one or more payees.

When a payor, such as an insurance company, makes a disbursement, such as a payout to an insurance policy holder, the payor's bank account, from which the funds are to be transferred, must have sufficient funds before the funds transfer takes place. The party performing the funds transfer, for example the payor's bank or a third party processor acting on behalf of the payor's bank, is a disbursement service provider. Before making the transfer, the disbursement service provider attempts to verify that sufficient funds exist in the payor's bank account using a manual (i.e., not automatic) process. For example, in some known systems where the disbursement service provider is a third party, the disbursement service provider manually exchanges notifications to and from the payor's bank to check the balance of the bank account. The disbursement service provider's manual method of attempting to check the account balance prior to initiating the transfer is error prone and may not be coordinated with the timing of the funds transfer. In situations where the payor is making many disbursements throughout a day, the likelihood of the disbursement service provider mistakenly initiating a funds transfer from the payor's bank account when insufficient funds are available increases. The payor's bank is liable for any overdrafts that might occur as a result. Further, in at least some known systems, payors maintain excess funds in their bank accounts to guard against an overdraft, when those excess funds could be used elsewhere.

BRIEF DESCRIPTION OF THE DISCLOSURE

In one aspect, a disbursement computing device for transmitting disbursements from a payor to a payee through a payment processing network is provided. The disbursement computing device is in communication with the payment processing network and is configured to receive a disbursement message including at least one disbursement payment instruction for transferring funds from a commercial disbursement financial account of a payor to a financial account of a payee. Each disbursement payment instruction includes a payor identifier, a payee identifier, and a disbursement amount. The disbursement computing device is also configured to automatically transmit, for each disbursement payment instruction, a purchase authorization request message to an issuer bank associated with the payor. The purchase authorization request message includes the disbursement amount. The disbursement computing device is further configured to receive a payment authorization message from the issuer bank associated with the payor that the commercial disbursement financial account has a balance that is at least equal to the disbursement amount, and initiate a transfer of funds equal to the disbursement amount from the financial account of the payor to the financial account of the payee.

In another aspect, a method for transmitting disbursements from a payor to a payee through a payment processing network is provided. The method is implemented by a disbursement computing device in communication with a payment processing network. The disbursement computing device includes one or more processors in communication with a memory. The method includes receiving a disbursement message including at least one disbursement payment instruction for transferring funds from a commercial disbursement financial account of a payor to a financial account of a payee. Each disbursement payment instruction includes a payor identifier, a payee identifier, and a disbursement amount. The method also includes automatically transmitting, for each disbursement payment instruction, a purchase authorization request message to an issuer bank associated with the payor. The purchase authorization request message includes the disbursement amount. The method further includes receiving a payment authorization message from the issuer bank associated with the payor that the commercial disbursement financial account has a balance that is at least equal to the disbursement amount, and initiating a transfer of funds equal to the disbursement amount from the financial account of the payor to the financial account of the payee.

In yet another aspect, a non-transitory computer-readable storage medium having computer-executable instructions embodied thereon is provided. When executed by a disbursement computing device coupled to a payment network and having at least one processor coupled to a memory, the computer-executable instructions cause the disbursement computing device to receive a disbursement message including at least one disbursement payment instruction for transferring funds from a commercial disbursement financial account of a payor to a financial account of a payee. Each disbursement payment instruction includes a payor identifier, a payee identifier, and a disbursement amount. The computer-executable instructions also cause the disbursement computing device to automatically transmit, for each disbursement payment instruction, a purchase authorization request message to an issuer bank associated with the payor. The purchase authorization request message includes the disbursement amount. The computer-executable instructions further cause the disbursement computing device to receive a payment authorization message from the issuer bank associated with the payor that the commercial disbursement financial account has a balance that is at least equal to the disbursement amount, and initiate a transfer of funds equal to the disbursement amount from the financial account of the payor to the financial account of the payee.

In one aspect, a disbursement computing device for transmitting disbursements from a payor to a payee through a payment processing network is provided. The disbursement computing device is in communication with the payment processing network and is configured to receive a registration request message from an issuer bank associated with a payor. The registration request message includes a primary account number of a commercial disbursement financial account associated with the payor. Additionally, the disbursement computing device is configured to assign a payor identifier to the primary account number and receive a disbursement message including at least one disbursement payment instruction for transferring funds to a financial account of a payee, wherein each disbursement payment instruction includes the payor identifier, a payee identifier, and a disbursement amount. For each disbursement payment instruction, the disbursement computing device transmits a purchase authorization request message to the issuer bank associated with the payor, wherein the purchase authorization request message includes the disbursement amount. Additionally, the disbursement computing device receives a payment authorization message from the issuer bank associated with the payor that the commercial disbursement financial account has a balance that is at least equal to the disbursement amount, transmits the payment authorization message to a payee bank associated with the payee, receives a payment approval message from the payee bank that the financial account of the payee is valid, and transmits a notification message to the payee that the disbursement amount has been transferred to the financial account of the payee.

In another aspect, a method for transmitting disbursements from a payor to a payee through a payment processing network is provided. The method is implemented by a disbursement computing device in communication with a payment processing network. The disbursement computing device includes one or more processors in communication with a memory. The method includes receiving a registration request message from an issuer bank associated with a payor. The registration request message includes a primary account number of a commercial disbursement financial account associated with the payor. The method additionally includes assigning a payor identifier to the primary account number and receiving a disbursement message including at least one disbursement payment instruction for transferring funds to a financial account of a payee, wherein each disbursement payment instruction includes the payor identifier, a payee identifier, and a disbursement amount. The method additionally includes, for each disbursement payment instruction, transmitting a purchase authorization request message to the issuer bank associated with the payor, wherein the purchase authorization request message includes the disbursement amount, receiving a purchase approval message from the issuer bank associated with the payor that the commercial disbursement financial account has a balance that is at least equal to the disbursement amount, transmitting the payment authorization message to a payee bank associated with the payee, receiving a payment approval message from the payee bank that the financial account of the payee is valid, and transmitting a notification message to the payee that the disbursement amount has been transferred to the financial account of the payee.

In yet another aspect, a computer-readable storage medium having computer-executable instructions embodied thereon is provided. When executed by a disbursement computing device coupled to a payment network and having at least one processor coupled to a memory, the computer-executable instructions cause the disbursement computing device to receive a registration request message from an issuer bank associated with a payor. The registration request message includes a primary account number of a commercial disbursement financial account associated with the payor. Additionally, the disbursement computing device assigns a payor identifier to the primary account number and receives a disbursement message including at least one disbursement payment instruction for transferring funds to a financial account of a payee, wherein each disbursement payment instruction includes the payor identifier, a payee identifier, and a disbursement amount. For each disbursement payment instruction, the disbursement computing device transmits a purchase authorization request message to the issuer bank associated with the payor, wherein the purchase authorization request message includes the disbursement amount, receives a payment authorization message from the issuer bank associated with the payor that the commercial disbursement financial account has a balance that is at least equal to the disbursement amount, transmits the payment authorization message to a payee bank associated with the payee, receives a payment approval message from the payee bank that the financial account of the payee is valid, and transmits a notification message to the payee that the disbursement amount has been transferred to the financial account of the payee.

BRIEF DESCRIPTION OF THE DRAWINGS

FIG. 1 is a schematic diagram illustrating an example payment processing system for processing disbursements from a commercial disbursement financial account to one or more payee financial accounts.

FIG. 2 is a simplified block diagram of the payment processing system shown in FIG. 1 including a payment processing server computing device, a disbursement computing device, and a plurality of computing devices in accordance with one example embodiment of the present disclosure.

FIG. 3 is an expanded block diagram of a server architecture of the payment processing system shown in FIG. 2 including the plurality of computing devices in accordance with one example embodiment of the present disclosure.

FIG. 4 illustrates a configuration of a client system shown in FIGS. 2 and 3 in accordance with one example embodiment of the present disclosure.

FIG. 5 illustrates a configuration of a server system shown in FIGS. 2 and 3 in accordance with one example embodiment of the present disclosure.

FIG. 6 is a diagram of an example process for establishing a commercial disbursement financial account and processing a disbursement, in accordance with the present disclosure.

FIG. 7 is a diagram of an example balance management process in accordance with the present disclosure.

FIG. 8 is a flowchart of an example process implemented by the disbursement computing device shown in FIG. 2 for processing disbursements from a commercial disbursement financial account in one example embodiment of the present disclosure.

FIG. 9 is a diagram of components of one or more example computing devices that may be used in the system shown in FIGS. 1 and 2.

DETAILED DESCRIPTION OF THE DISCLOSURE

Figure 1:
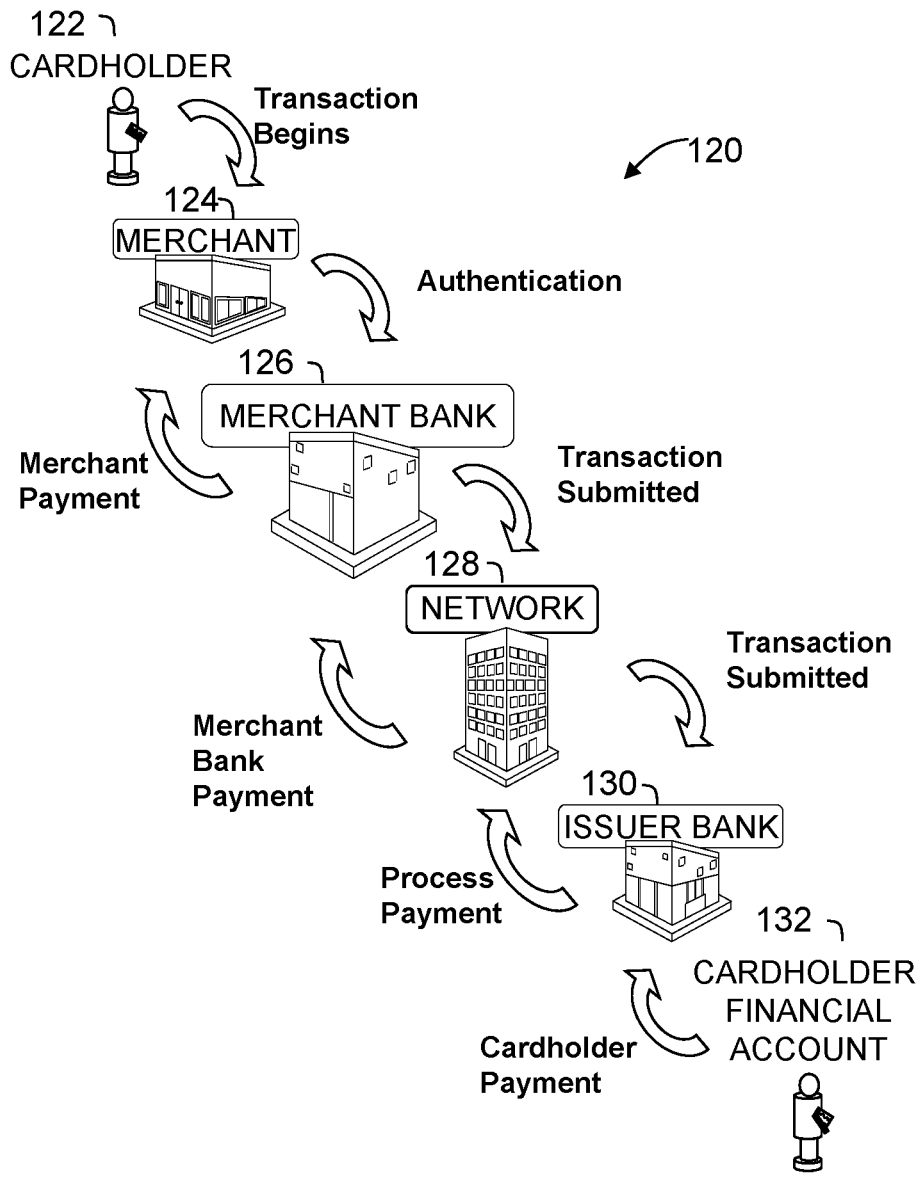
FIGS. 1-9 show example embodiments of the methods and systems described herein.

The system described herein includes a disbursement computing device for transmitting disbursements from a payor to a payee through a payment processing network. The disbursement computing device is in communication with and/or integral to the payment processing network. In a first embodiment, the disbursement computing device is configured to receive a registration request message from an issuer bank associated with a payor. The registration request message is configured to register the payor for the disbursement services provided by the disbursement computing device. The registration request message includes a primary account number (PAN) and/or another account identifier of a commercial disbursement financial account associated with the payor. In one embodiment, the commercial disbursement financial account is configured or has controls associated with it to allow the owner of the account (e.g., the payor) to make disbursements using the account, but not to purchase goods or services. The disbursement computing device assigns a payor identifier to the PAN associated with the commercial disbursement financial account of the payor. The payor identifier may be an alphanumeric code that is mapped to the PAN and associated with the payor, such that the payor may be identified without transmission of the PAN, thereby providing additional account security for the payor's commercial disbursement financial account.

The disbursement computing device receives a disbursement data file or message from the payor. In the example embodiment, the disbursement message includes at least one disbursement payment instruction for transferring funds from the payor's commercial disbursement financial account to a financial account of a payee. In addition, each disbursement payment instruction includes the payor identifier and a disbursement amount. The disbursement payment instruction may further include, for example, a payee identifier and/or any other information. A payee identifier may include any identifier associated with a payee financial account (e.g., an alphanumeric identifier similar to the payor identifier, but that is assigned to a PAN of the payee financial account). The disbursement message may include any number of disbursement payment instructions (e.g., 1, 10, 100, 1000, etc.). In the example embodiment, the disbursement message may be transmitted to the disbursement computing device using any number of communication protocols. For example, the disbursement message may be transmitted from the payor (e.g., from a computing device associated with the payor) to the disbursement computing device via Short Message Service (SMS), email, phone, a network message associated with the payment network (e.g., an International Organization for Standardization (ISO) 8583 network message), a specific software application associated with the disbursement computing device, and/or any other communication protocol. In some embodiments, the disbursement message is sent as part of a MasterCard MoneySend® transaction (MasterCard MoneySend is a registered trademark of MasterCard International Incorporated, Purchase, N.Y.), and/or any of the steps described further herein may be performed as part of a MasterCard MoneySend® transaction.

Moreover, in the example embodiment, the disbursement message is configured to trigger the disbursement computing device to automatically generate and transmit a purchase authorization request message to the issuer bank associated with the payor. For example, the disbursement message may be formatted to include instructions that, when processed by the disbursement computing device, cause the disbursement computing device to automatically initiate the generation and transmission of the purchase authorization request message. For each disbursement payment instruction included in the disbursement message, the disbursement computing device automatically generates and transmits a purchase authorization request message. In some embodiments, the purchase authorization request message is transmitted to the issuer bank over the payment processing network, for example, formatted as a network message. The purchase authorization request message may be similar to an authorization request message associated with a purchase transaction (e.g., for goods at a merchant). However, as described further herein, the purchase authorization request message generated by the disbursement computing device includes additional data fields specific to the commercial disbursement process.

The purchase authorization request message includes the disbursement amount. Additionally, in some embodiments, the purchase authorization request message includes an additional data field corresponding to (and including) a disbursement authorization identifier. The disbursement authorization identifier is configured to associate one particular purchase authorization request message with one particular disbursement payment instruction. The disbursement computing device generates each disbursement authorization identifier, for example, as a random alphanumeric code having a particular number of digits (e.g., a six-digit code). The disbursement computing device also generates a table or other data structure to store the disbursement authorization identifiers. For example, the disbursement computing device may store disbursement authorization identifiers in one column of the table associated with each purchase authorization request message generated in response to a disbursement payment instruction. It should be understood that the disbursement authorization identifier may have any format, length, or configuration. For example, in another embodiment, the disbursement computing device may generate disbursement authorization identifiers in numeric order for each purchase authorization request message (e.g., 000001, 000002, 000003, etc.). In such embodiments, the disbursement computing device may generate and store a new table for each day and/or clear the table after each day.

The issuer bank automatically processes the purchase authorization request message to validate that the commercial disbursement financial account associated with the payor has sufficient funds to complete the funds transfer in the disbursement amount. The issuer bank may parse the payor identifier from the purchase authorization request message and use the payor identifier to identify the commercial disbursement financial account (e.g., using a lookup table that maps the payor identifier to the PAN). In one embodiment, the purchase authorization request message also includes a data field corresponding to (and including) a funds capture instruction. The funds capture instruction may be as small as one bit occupied by a 0 or 1. A 0 may represent a "null" or no instruction, and a 1 may represent an automatic "action" or "initiate" instruction. Alternatively, the funds capture instruction may have any other length, format, or configuration. If the commercial disbursement financial account has a balance at least equal to the disbursement amount, the issuer bank responds to an automatic initiation funds capture instruction by automatically capturing funds in the disbursement amount. The issuer bank, as part of the funds capture, transfers (or "debits") the funds in the disbursement amount from the commercial disbursement financial account to a settlement financial account maintained at the issuer bank. The settlement financial account is maintained for a settlement process, as described further herein.

Additionally, the issuer bank transmits a payment authorization message back to the disbursement computing device. The payment authorization message indicates that the commercial disbursement financial account has a balance that is at least equal to the disbursement amount. In other words, the issuer bank communicates to the disbursement computing device that the funds transfer may proceed. In one embodiment, the payment authorization message is formatted as a network message and is transmitted through the payment processing network. The payment authorization message may include the disbursement amount, the payor identifier, and/or the payee identifier, as well as a data field corresponding to (and including) the disbursement authorization identifier, which is re-transmitted in the payment authorization message to the disbursement computing device. Accordingly, the disbursement computing device receives and processes the payment authorization message from the issuer bank, and parses the disbursement authorization identifier from the corresponding data field. The disbursement computing device then accesses the table and identifies the particular disbursement payment instruction associated with the received payment authorization message by locating the same disbursement authorization identifier in the table. The disbursement computing device may add the disbursement authorization identifier to a second column (in the same row associated with the particular disbursement payment instruction) associated with a payment authorization message. The disbursement computing device may additionally or alternatively add an indicator in another column (in the same row associated with the particular disbursement payment instruction) that the purchase authorization request message was validated by the issuer bank (i.e., that the commercial disbursement financial account has sufficient funds for the disbursement). In other words, the disbursement authorization identifier and corresponding data field permits the disbursement computing device to track incoming and outgoing messages associated with one particular funds disbursement, no matter how many disbursement payment instructions the disbursement computing device is handling substantially simultaneously and/or within a certain period of time.

If the issuer bank determines that the commercial disbursement financial account does not have a balance at least equal to the disbursement amount, the issuer bank is configured to disregard, ignore, or otherwise not respond to the funds capture instruction, whether the funds capture instruction is null or includes an automatic initiation instruction. In addition, the issuer bank transmits a payment denial message to the disbursement computing device. The payment denial message may be transmitted over the payment processing network, for example, formatted as a network message. The payment denial message includes a data field corresponding to (and including) the disbursement authorization identifier, which is re-transmitted in the payment denial message to the disbursement computing device. Accordingly, the disbursement computing device receives and processes the payment denial message from the issuer bank, and parses the disbursement authorization identifier from the corresponding data field. The disbursement computing device then accesses the table and identifies the particular disbursement payment instruction associated with the received payment denial message by locating the same disbursement authorization identifier in the table. The disbursement computing device may add the disbursement authorization identifier to a second column (in the same row associated with the particular disbursement payment instruction) associated with a payment denial message. The disbursement computing device may additionally or alternatively add an indicator in another column (in the same row associated with the particular disbursement payment instruction) that the purchase authorization request message was denied by the issuer bank (i.e., that the commercial disbursement financial account does not have sufficient funds for the disbursement).

In some embodiments, after receiving a payment authorization message from the issuer bank associated with the payor, the disbursement computing device transmits the payment authorization message to a payee bank associated with the payee. The payment authorization message includes the payee identifier and may further include the disbursement amount. In some embodiments, the payment authorization message already includes the payee identifier data field (and, accordingly, the payee identifier) prior to transmission of the payment authorization message to the disbursement computing device. For example, the issuer bank may append the data field including the payee identifier to the payment authorization message. The disbursement computing device utilizes the payee identifier to identify the payee financial account maintained at the payee bank (e.g., using a lookup table that maps the payee identifier to a PAN of the payee's financial account), such that the disbursement computing device accurately routes the payment authorization to the payee bank. The payment authorization message may be transmitted over the payment processing network, for example, formatted as a network message. In other embodiments, the disbursement computing device appends the additional data field to the payment authorization message, the additional data field corresponding to (and including) the payee identifier. Additionally, the payment authorization message includes the data field corresponding to (and including) the disbursement authorization identifier. The disbursement computing device may add an indicator to the table in another column (in the same row associated with the particular disbursement payment instruction) that the payment authorization message has been transmitted to the payee bank.

The payee bank receives and processes the payment authorization message to validate the payee financial account. The payee bank identifies the financial account of the payee (e.g., using the payee identifier), and confirms that the payee's financial account is valid and available for a funds transfer. In some embodiments, the disbursement computing device appends an additional data field to the payment authorization message prior to transmitting the payment authorization message to the payee bank, the additional data field corresponding to (and including) a funds credit instruction. The funds credit instruction may be as small as one bit occupied by a 0 or 1. A 0 may represent a "null" or no instruction, and a 1 may represent an automatic "action" or "initiate" instruction. Alternatively, the funds credit instruction may have any other length, format, or configuration. An automatic initiation funds credit instruction triggers the payee bank to automatically transfer ("credit") funds in the disbursement amount to the payee financial account.

The payee bank also transmits a payment approval message to the disbursement computing device. The payment approval message may be transmitted over the payment processing network, for example, formatted as a network message. The payment approval message includes a data field indicating that the payee financial account is valid and that the funds transfer was successfully completed. The payment approval message may include the data field corresponding to (and including) the disbursement authorization identifier. Accordingly, the disbursement computing device receives and processes the payment approval message from the payee bank, and parses the disbursement authorization identifier from the corresponding data field. The disbursement computing device then accesses the table and identifies the particular disbursement payment instruction associated with the received payment approval message by locating the same disbursement authorization identifier in the table. The disbursement computing device may add the disbursement authorization identifier to another column (in the same row associated with the particular disbursement payment instruction) associated with a payment approval message. The disbursement computing device may additionally or alternatively add an indicator in another column (in the same row associated with the particular disbursement payment instruction) that the funds transfer was successfully completed.

The disbursement computing device may then transmit a notification message to the payee (e.g., to a computing device associated with the payee) that the disbursement amount has been transferred to the payee financial account. The notification message may be transmitted to the payee using any number of communication protocols. For example, the notification message may be transmitted from the disbursement computing device to the payee via SMS, email, phone, a network message associated with the payment processing network, a specific software application associated with the disbursement computing device, and/or any other communication protocol. Alternatively or additionally, the payee bank may transmit the notification message to the payee. Alternatively or additionally, the disbursement computing device and/or the payee bank may transmit the notification message to the payor.

The processes described above with respect to a single disbursement payment instruction apply similarly to any number of disbursement payment instructions as included in the disbursement message. In certain embodiments, a disbursement message includes a batch of disbursement payment instructions. The disbursement computing device processes each disbursement payment instruction as described above, and compiles or consolidates all payment approval or denial messages into a single batch file (e.g., as a table including indications of whether each disbursement associated with each of the plurality of disbursement payment instructions was approved or denied). The disbursement computing device stores the batch file for clearing and settlement of all the disbursements, for example, in the next settlement cycle. The disbursement computing device may transmit the batch file to the payor, the issuer bank associated with the commercial disbursement financial account of the payor, the payee bank, and/or the payment processing network for clearing and settlement. In one example embodiment of a settlement process, the disbursement computing device transmits the batch file (and/or any other stored approval/denial responses, e.g., additional batch and/or single-disbursement files) to the issuer bank associated with the payor. The issuer bank uses funds captured and transferred to the settlement financial account to settle the disbursements with one or more payee banks.

The methods and systems described herein may be implemented using computer programming or engineering techniques including computer software, firmware, hardware or any combination or subset thereof, wherein the technical effect is achieved by performing at least one of: (a) receiving a disbursement message including at least one disbursement payment instruction for transferring funds from a commercial disbursement financial account of a payor to a financial account of a payee, each disbursement payment instruction including a payor identifier, a payee identifier, and a disbursement amount; (b) automatically transmitting, for each disbursement payment instruction, a purchase authorization request message to an issuer bank associated with the payor, wherein the purchase authorization request message includes the disbursement amount; (c) receiving a payment authorization message from the issuer bank associated with the payor that the commercial disbursement financial account has a balance that is at least equal to the disbursement amount; and (d) initiating a transfer of funds equal to the disbursement amount from the financial account of the payor to the financial account of the payee. The technical effect may additionally or alternatively be achieved by performing at least one of: (e) receiving a registration request message from an issuer bank associated with a payor, the registration request message including a primary account number of a commercial disbursement financial account associated with the payor; (f) assigning a payor identifier to the primary account number associated with the commercial disbursement financial account; (g) transmitting the payment authorization message to a payee bank associated with the payee; (h) receiving a payment approval message from the payee bank that the financial account of the payee is valid; and/or (i) transmitting a notification message to the payee that the disbursement amount has been transferred to the financial account of the payee. More specifically, in at least some implementations, one or more server computing devices described herein are specially programmed with computer code to perform the above processes.

The technical effects described herein apply to the technical field of electronically transmitting disbursements from a payor to a payee. The systems and methods described herein provide the technical advantage of enabling disbursements to be transmitted through an existing payment processing network between a commercial disbursement financial account of a payor and financial accounts of payees, without requiring a separate network infrastructure to be developed. Rather, the systems and methods described herein include transforming, updating, and/or re-formatting existing network messages to include additional data fields specific to the disbursement process. Additionally, the systems and methods described herein solve problem specifically arising in the computer networking and transaction processing fields. Specifically, these fields are transitioning towards increasingly real-time processing. "Real-time" refers to outcomes occurring at a substantially short period after an input (e.g., from about milliseconds to minutes, or hours, as opposed to a matter of days). The time period is a result of the capability of the disbursement computing device and/or the payment processing network implementing processing of the inputs to generate the outcome. Events occurring in real-time occur without substantial intentional delay. As disbursements transition from batch processes involving paper checks to real-time disbursements, the need for real-time, continual, and/or high-speed validation of financial account balances increases. Manual processes, implemented on a daily or otherwise long-interval basis, no longer meet the evolving needs of the computer networking and transaction processing fields.

The systems and methods described herein enable such disbursements to occur while ensuring that the commercial disbursement financial account has sufficient funds for each disbursement. The commercial disbursement financial account is a financial account that is specifically configured for use with making disbursements to one or more payees, for example from an insurer to one or more insurance policy holders, and is restricted from being used for other types of transactions, such as purchases of goods and/or services. Accordingly, a payor, for example an insurance company, can rapidly issue electronic payments to payees while ensuring that the payor's commercial disbursement financial account does not get overdrafted due to one or more of the payments. More specifically, a disbursement service provider can get substantially real-time verification for each disbursement and can ensure that sufficient funds are in the commercial disbursement financial account to cover disbursements made by the payor. By providing verification that sufficient funds are available prior to initiating a disbursement, the system described herein reduces the likelihood of a disbursement causing an overdraft of the payor's financial account, which the disbursement service provider would be liable for. Moreover, the system described herein increases speed and through-put of disbursements from banks and through payment processing networks through the transmission of network messages to parties involved in the disbursement, the network messages triggering real-time and automatic processing of the disbursement according to disbursement payment instructions.

As used herein, the terms "transaction card," "financial transaction card," and "payment card" refer to any suitable transaction card, such as a credit card, a debit card, a prepaid card, a charge card, and/or any other device that may hold payment account information, such as mobile phones, smartphones, personal digital assistants (PDAs), key fobs, and/or computers. Each type of transaction card can be used as a method of payment for performing a transaction.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example payment processing system 100 for processing disbursements from a commercial disbursement financial account to one or more payee financial accounts. The present disclosure relates to payment processing system 100, such as a credit card payment system using the MasterCard® payment card system payment network 128 (also referred to as an "interchange" or "interchange network"). MasterCard® payment card system payment network 128 is a proprietary communications standard promulgated by MasterCard International Incorporated® for the exchange of financial transaction data between financial institutions that are members of the MasterCard® payment card system payment network 128. (MasterCard is a registered trademark of MasterCard International Incorporated located in Purchase, N.Y.).

In payment card system 120, a financial institution such as an issuer 130 issues a payment account card, such as a credit card account or a debit card account, to a cardholder 122. Cardholder 122 may uses the payment account card to tender payment for a purchase from a merchant 124. In the example embodiment, cardholder 122 may represent a payor 122. Payor 122 may only be permitted to use the payment account card (and/or an associated commercial disbursement financial account) to render disbursements, not to make purchases. Moreover, in the example embodiment, merchant 124 may represent a payee 124. To accept payment with the payment account card, payee 124 must normally establish an account with a financial institution that is part of the financial payment system. This financial institution is usually called the "merchant bank", the "payee bank", the "sponsor bank", the "acquiring bank", the "acquirer bank" or simply "acquirer". With reference to a general purchase transaction, when a cardholder 122 tenders payment for a purchase with a payment account card (also known as a financial transaction card), merchant 124 requests authorization from acquirer 126 for the amount of the purchase. The request may be performed over the telephone, but is usually performed through the use of a point-of-interaction terminal, which reads the cardholder's account information from the magnetic stripe or EMV chip on the payment account card and communicates electronically with the transaction processing computers of acquirer 126. In some instances, a merchant (e.g., merchant 124) stores payment card information associated with a cardholder (e.g., cardholder 122) and requests authorization from acquirer 126 using the stored payment card information, rather than reading the cardholder's account information from the payment card itself (i.e., a card-on-file (COF) transaction).

Using payment card system payment network 128, the computers of acquirer 126 will communicate with the computers of issuer 130, to determine whether the cardholder's account 132 is in good standing and whether the purchase is covered by the cardholder's available credit line or account balance. Based on these determinations, the request for authorization will be declined or accepted. When a request for authorization is accepted, the available credit line or available balance of cardholder's account 132 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 124 captures the transaction by, for example, appropriate data entry procedures on the point-of-interaction terminal. For PIN debit card transactions, when a request for authorization is approved by the issuer, the cardholder's account 132 is decreased. Normally, a charge is posted immediately to cardholder's account 132. The bankcard association then transmits the approval to the acquiring processor for distribution of goods/services, or information or cash in the case of an ATM.

After a transaction is captured, the transaction is cleared and settled between merchant 124, acquirer 126, and issuer 130. Clearing refers to the communication of financial data for reconciliation purposes between the parties. Settlement refers to the transfer of funds between the merchant's account, acquirer 126, and issuer 130 related to the transaction.

Figure 2:
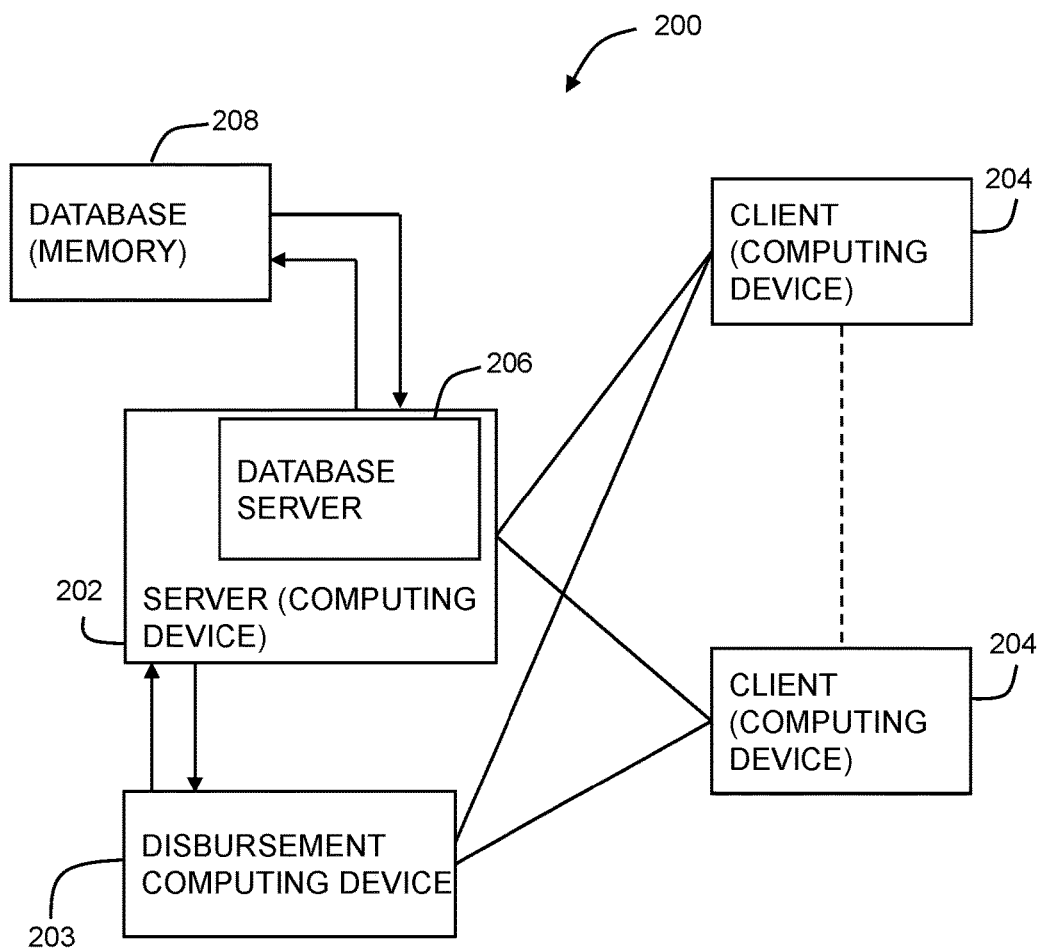

FIG. 2 is a simplified block diagram of payment processing system 100 (shown in FIG. 1) with a disbursement computing device 203 in accordance with one embodiment of the present disclosure. In the example embodiment, system 100 includes a payment processing server computing device 202 (which is associated with and/or integral to payment processing network 128, shown in FIG. 1), disbursement computing device 203, and a plurality of client subsystems 204, also referred to as client systems or client computing devices, connected to payment processing server computing device 202 and disbursement computing device 203. In one embodiment, client systems 204 are computers including a web browser, such that disbursement computing device 203 is accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a web-based phone, personal digital assistant (PDA), or other web-connectable equipment. In one embodiment, client computing device 204 includes a point-of-sale (POS) device, a payee or payor computing device (e.g., a smartphone, a tablet, or other computing device), or any other computing device capable of communicating with payment processing server computing device 202 and/or disbursement computing device 203.

A database server 206 is connected to a database 208 containing information on a variety of matters, as described below in greater detail. In one embodiment, database 208 is stored on disbursement computing device 203 and may be accessed by potential users at one of client systems 204 by logging onto disbursement computing device 203 through one of client systems 204. In an alternative embodiment, database 208 is stored remotely from disbursement computing device 203 and may be non-centralized. As discussed below, commercial disbursement financial account identifiers, commercial disbursement financial account balances, disbursement amounts, and payee financial account identifiers are stored in database 208. Disbursement computing device 203 could be any type of computing device configured to perform the steps described herein. In at least some implementations, disbursement computing device 203 is included in payment processing server computing device 202 (i.e., is integral to payment processing network 128). In other implementations, disbursement computing device 203 is distinct from payment processing server computing device 202 and is in communication with payment processing server computing device 202.

Figure 3:
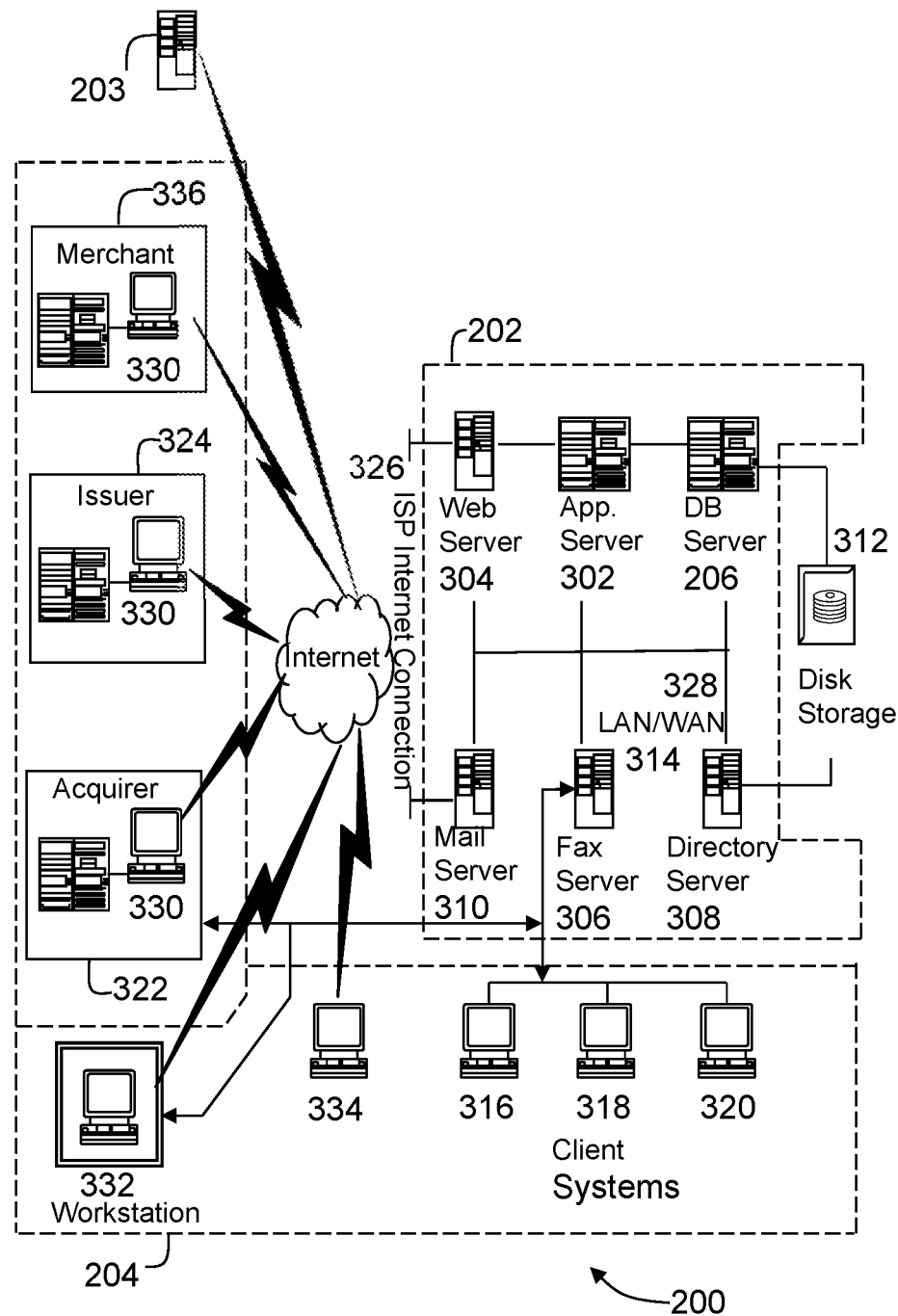

FIG. 3 is an expanded block diagram of an example embodiment of a server architecture of payment processing system 100 in accordance with one embodiment of the present disclosure. Payment processing system 100 includes payment processing server computing device 202, disbursement computing device 203, and client systems 204. Payment processing server computing device 202 includes database server 206, an application server 302, a web server 304, a fax server 306, a directory server 308, and a mail server 310. A disk storage unit 312 is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Server system 202 is configured to be communicatively coupled to various entities, including acquirers 322 and issuers 324, and to disbursement computing device 203 using an Internet connection 326. In at least some implementations, server system 202 is also communicatively coupled with one or more merchants 336 (e.g., a payor, such as an insurance company). The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328.

In the example embodiment, any authorized individual or entity having a workstation 330 may access system 100. At least one of the client systems includes a manager workstation 332 located at a remote location. Workstations 330 and 332 include personal computers having a web browser. Also, workstations 330 and 332 are configured to communicate with disbursement computing device 203. Furthermore, fax server 306 communicates with remotely located client systems, including a client system 332, using a telephone link. Fax server 306 is configured to communicate with other client systems 316, 318, and 320 as well.

Figure 4:
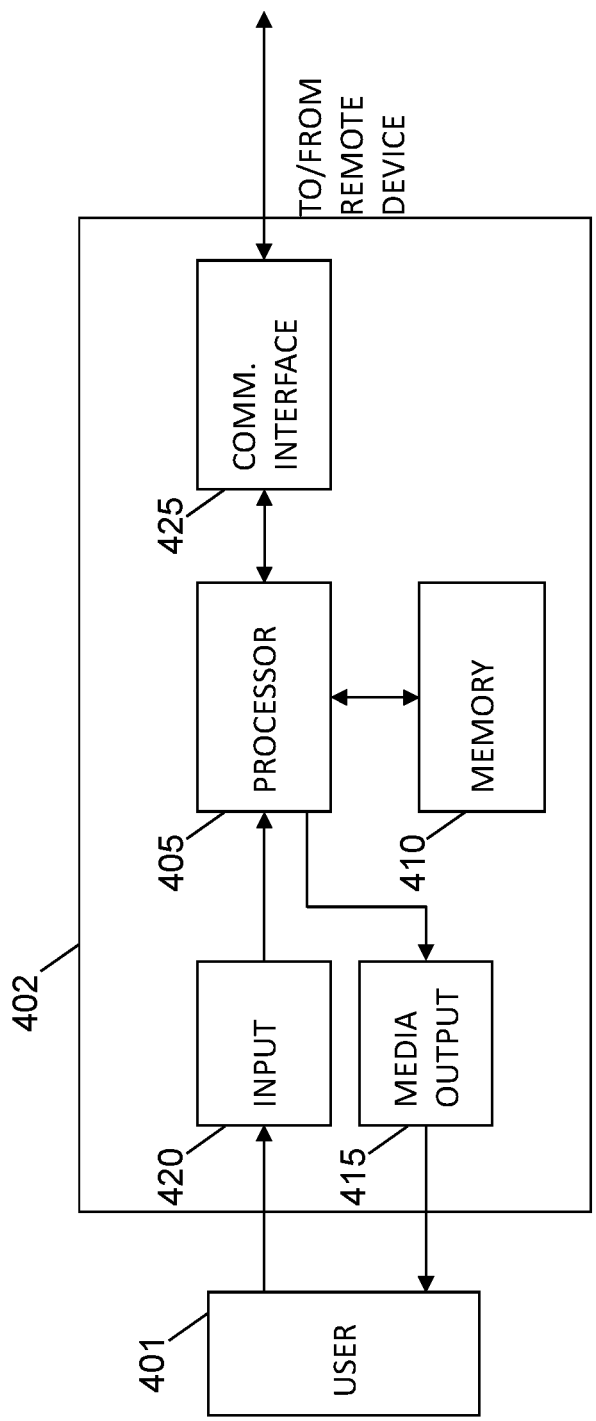

FIG. 4 illustrates an example configuration of a client computing device 402. Client computing device 402 may include, but is not limited to, client systems ("client computing devices") 204, 316, 318, and 320, workstations 330 and 332, computing devices of other entities (e.g., payors and/or payees).

Client computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Client computing device 402 also includes at least one media output component 415 for presenting information to a user 401 (e.g., a cardholder 122). Media output component 415 is any component capable of conveying information to user 401. In some embodiments, media output component 415 includes an output adapter such as a video adapter and/or an audio adapter. An output adapter is operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 420 for receiving input from user 401. Input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

Client computing device 402 may also include a communication interface 425, which is communicatively coupleable to a remote device such as server system 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and client application. Web browsers enable users 401 to display and interact with media and other information typically embedded on a web page or a website from a web server associated with a merchant. A client application allows users 401 to interact with a server application, for example a server application associated with a merchant.

Figure 5:
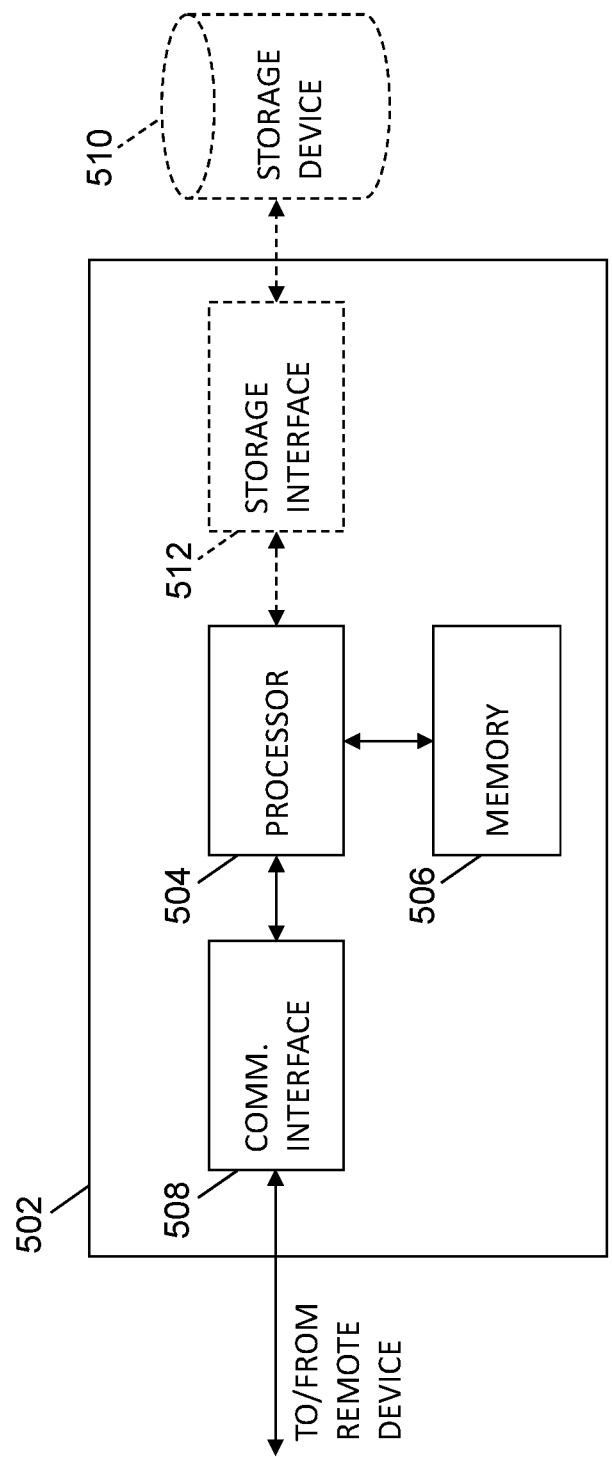

FIG. 5 illustrates an example configuration of a server computing device 502 such as payment processing server computing device 202 (shown in FIGS. 2 and 3). Server computing device 502 is representative of database server 206, application server 302, web server 304, fax server 306, directory server 308, mail server 310, and disbursement computing device 203.

Server computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that server computing device 502 is capable of communicating with a remote device such as client computing device 402 or another server computing device 502. For example, communication interface 508 may receive requests from client systems 204 via the Internet, as illustrated in FIGS. 2 and 3.

Processor 504 may also be operatively coupled to a storage device 510. Storage device 510 is any computer-operated hardware suitable for storing and/or retrieving data. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of data and/or a computer program.

Figure 6:
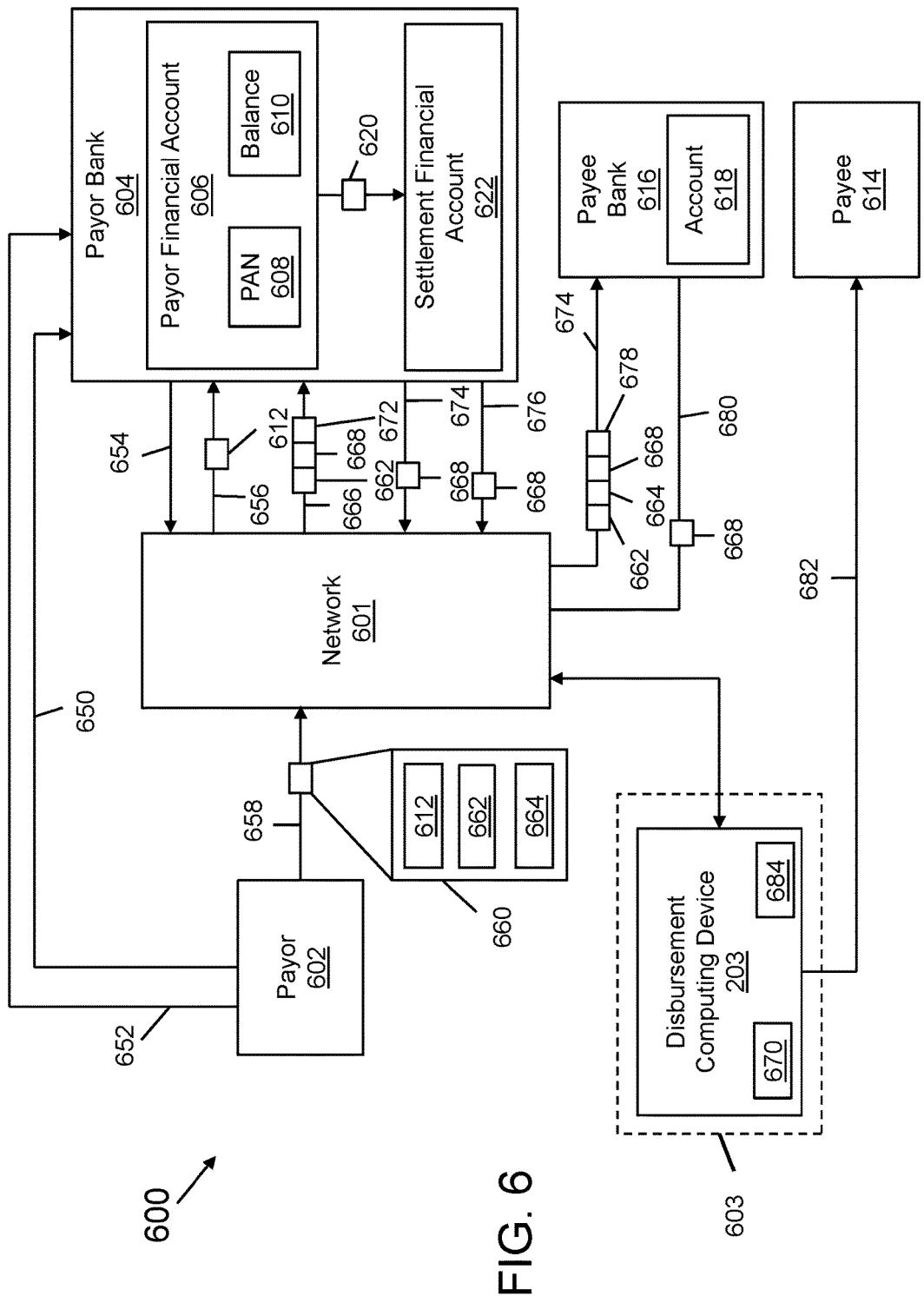

FIG. 6 is a data flow diagram of an example process 600 for establishing a commercial disbursement financial account and processing a disbursement therefrom, in accordance with the present disclosure. In some embodiments, at least some of the steps of data flow 600 as described herein are implemented using payment processing system 100 (shown in FIGS. 1 and 2). In the illustrated embodiment, the disbursement is processed through a payment processing network 601. In some embodiments, network 601 is payment network 128 (shown in FIG. 1), including payment processing server computing device 202 (shown in FIG. 2), described above. In other embodiments, network 601 is any other network that enables the processes described herein to be performed. More specifically, in certain embodiments, one network (e.g., network 601) may be involved in the transmission of network messages, as described herein, particularly during authorization of a payor financial account. Another network (not shown) may be involved in the routing networks messages and/or of funds to a payee financial account. In some embodiments, process 600 is performed as a MasterCard MoneySend® transaction.

In the illustrated embodiment, disbursement computing device 203 (also shown in FIG. 2) is operated by a disbursement service provider 603. In at least some embodiments, disbursement service provider 603 includes or is associated with a payor's issuing bank 604 ("payor bank" 604). In other embodiments, disbursement service provider 603 includes or is associated with an acquirer or sponsor bank that cooperates with payor bank 604 (and/or serves as payor bank 604) and payment network 601 to facilitate the processes described herein. In some embodiments, disbursement service provider 603 is operated by the same entity that operates payment network 601.

Initially, a payor 602 (e.g., an insurance company or another commercial entity) transmits a communication 650 to open a commercial disbursement financial account 606 with payor bank 604. Commercial disbursement financial account 606 has a primary account number (PAN) 608 (and/or any other account identifier) associated therewith. In some embodiments, commercial disbursement financial account 606 is configured or has controls associated therewith to allow the owner of commercial disbursement financial account 606 (e.g., payor 602) to make disbursements using commercial disbursement financial account 606, but not to purchase goods or services. In at least some embodiments, payor bank 604 disbursement computing device 203, and/or disbursement service provider 603 perform(s) a setup and manual vetting process that ensures that payor 602 (e.g., the disburser) is approved to make disbursements. Payor 602 pre-funds (i.e., transfers funds to) commercial disbursement financial account 606, such that commercial disbursement financial account 606 has a balance 610 of funds therein. In certain embodiments, payor bank 604 issues a payment card (e.g., a debit card, prepaid card, credit card, etc.) associated with commercial disbursement financial account 606 to payor 602. In some embodiments, the issuer of the payment card is a different bank (not shown) than payor bank 604. This allows payor 602 to keep their funds at their choice of bank, while transacting for the disbursement service provided by disbursement computing device 203 at payor bank 604, which offers the disbursement's service.

In some embodiments, payor bank 604 transmits a registration request message 654 to disbursement computing device 203. Registration request message 654 is configured to initiate registration of commercial disbursement financial account 606 for the disbursement services of disbursement computing device 203. Registration request message 654 includes an identifier of commercial disbursement financial account 606 such as PAN 608, as well as an indication of payor 602 associated with commercial disbursement financial account 606. In some embodiments, registration request message 654 is transmitted through network 601, for example, formatted as a network message (e.g., an ISO 8583 network message). In other embodiments, registration request message 654 is transmitted over another network (e.g., an alternative payment processing network or using any other communication protocol). Registration request message 654 causes disbursement computing device 203 to register PAN 608 for use for disbursements. In particular, disbursement computing device 203 generates a payor identifier 612 and associates payor identifier 612 with commercial disbursement financial account 606. More specifically, disbursement computing device 203 assigns payor identifier 612, which may be an alphanumeric code, to PAN 608 associated with commercial disbursement financial account 606 for use with disbursements. In other words, payor identifier 612 is a proxy for PAN 608, such that PAN 608 need not be distributed between parties of payment processing system 100, thereby facilitating increased security for commercial disbursement financial account 606.

In at least some embodiments, disbursement computing device 203 transmits a registration response message 656 to payor bank 604. Registration response message 656 includes payor identifier 612, such that payor identifier 612 may be communicated to payor 602 for initiation of disbursements. In some embodiments, registration response message 656 is transmitted through network 601, for example, formatted as a network message. In other embodiments, registration response message 656 is transmitted over another network (e.g., an alternative payment processing network or using any other communication protocol). In certain embodiments, additionally or alternatively, disbursement computing device 203 transmits payor identifier 612 directly to payor 602 (e.g., via SMS, email, phone, etc.). Moreover, in some embodiments, the above-described registration process is performed manually, rather than as a series of electronic communications.

To initiate a disbursement to a payee 614, payor 602 transmits a disbursement message 658 to disbursement computing device 203. In the example embodiment, disbursement message 658 includes at least one disbursement payment instruction 660 for transferring funds from commercial disbursement financial account 606 to a financial account 618 associated with payee 614 and maintained at a payee's issuing bank 616 ("payee bank" 616). Payee financial account 618 may include, for example, a payment card account. In other embodiments, payee financial account 618 is any other type of financial account that is capable of receiving funds as described herein, for example, through an automated clearing house (ACH) transaction. In addition, each disbursement payment instruction 660 includes payor identifier 612 and a disbursement amount 662. Each disbursement payment instruction 660 may further include, for example, a payee identifier 664 and/or any other information. Payee identifier 664 may include any identifier associated with payee financial account 618 (e.g., an alphanumeric identifier similar to payor identifier 612, but that is assigned to a PAN (not shown) of payee financial account 618). Disbursement message 658 may include any number of disbursement payment instructions 660 (e.g., 1, 10, 100, 1000, etc.). In various embodiments, disbursement message 658 may be transmitted to disbursement computing device 203 using any number of communication protocols. For example, disbursement message 658 may be transmitted from payor 602 (e.g., from a computing device (not shown) associated with payor 602) to disbursement computing device 203 via SMS, email, phone, a network message over network 601, a specific software application ("app") associated with disbursement computing device 203, and/or any other communication protocol.

Moreover, in the example embodiment, disbursement message 658 is configured to trigger disbursement computing device 203 to automatically generate and transmit a purchase authorization request message 666 to payor bank 604. For each disbursement payment instruction 660 included in the disbursement message 658, disbursement computing device 203 automatically generates and transmits a purchase authorization request message 666. In some embodiments, disbursement computing device 203 uses payor identifier 612 to identify payor bank 604 associated with commercial disbursement financial account 606. In some embodiments, purchase authorization request message 666 is transmitted to payor bank 604 over network 601, for example, formatted as a network message. Purchase authorization request message 666 may be similar to an authorization request message associated with a purchase transaction (e.g., for goods at a merchant). However, as described further herein, purchase authorization request message 666 generated by disbursement computing device 203 includes additional data fields specific to the commercial disbursement process 600.

Purchase authorization request message 666 includes disbursement amount 662. Additionally, in some embodiments, purchase authorization request message 666 includes an additional data field corresponding to (and including) a disbursement authorization identifier 668. Disbursement authorization identifier 668 is configured to associate one particular purchase authorization request message 666 with one particular disbursement payment instruction 660. Disbursement computing device 203 generates each disbursement authorization identifier 668, for example, as a random alphanumeric code having a particular number of digits (e.g., a six-digit code). Disbursement computing device 203 also generates a table 670 or other data structure to store disbursement authorization identifiers 668. For example, disbursement computing device 203 may store disbursement authorization identifiers 668 in one column of table 670, the column having a plurality of rows, wherein each row is associated with a purchase authorization request message 666 generated in response to a disbursement payment instruction 660. It should be understood that disbursement authorization identifiers 668 may have any format, length, or configuration. For example, in another embodiment, disbursement computing device 203 may generate disbursement authorization identifiers 668 in numeric order for each purchase authorization request message 666 (e.g., 000001, 000002, 000003, etc.). In such embodiments, disbursement computing device 203 may generate and store a new table 670 for each day and/or clear table 670 after each day.

Payor bank 604 automatically processes a received purchase authorization request message 666 to validate that commercial disbursement financial account 606 has sufficient funds to complete a funds transfer of disbursement amount 662. Payor bank 604 may parse payor identifier 612 from purchase authorization request message 666 and use payor identifier 612 to identify commercial disbursement financial account 606 (e.g., using a lookup table that maps payor identifier 612 to PAN 608). In one embodiment, purchase authorization request message 666 also includes a data field corresponding to (and including) a funds capture instruction 672. Funds capture instruction 672 may be as small as one bit occupied by a 0 or 1. A 0 may represent a "null" or no instruction, and a 1 may represent an automatic "action" or "initiate" instruction. Alternatively, funds capture instruction 672 may have any other length, format, or configuration. If balance 610 of commercial disbursement financial account 606 is at least equal to disbursement amount 662, payor bank 604 responds to an automatic initiation funds capture instruction 672 by automatically capturing funds 620 from commercial disbursement financial account 606 in disbursement amount 662. Payor bank 604, as part of this funds capture, transfers (or "debits") funds 620 in disbursement amount 662 from commercial disbursement financial account 606 to a settlement financial account 622 maintained at payor bank 604. Settlement financial account 604 is maintained for a settlement process, as described further herein.

Additionally, payor bank 604 transmits a payment authorization message 674 back to disbursement computing device 203. Payment authorization message 674 indicates that balance 610 of commercial disbursement financial account 606 is at least equal to disbursement amount 662. In other words, payor bank 604 communicates to disbursement computing device 602 that the funds transfer for the disbursement may proceed. In one embodiment, payment authorization message 674 is formatted as a network message and is transmitted through network 601. In some embodiments, payment authorization message 674 is, for example, but not limited to, a MasterCard MoneySend® message or data file that includes funds transfer instructions to payee bank 616, a VISA® Original Credit Transaction (VISA is a registered trademark of Visa International Service Association, Foster City, CA), a PIN Debit Networks payment transaction, an automated clearing house (ACH) transaction, or a Society for Worldwide Interbank Financial Telecommunication (SWIFT®; SWIFT is a registered trademark of Society for Worldwide Interbank Financial Telecommunication SCRL, Le Hulpe, Belgium) transaction.

Payment authorization message 674 includes a data field corresponding to (and including) disbursement authorization identifier 668, which is re-transmitted in payment authorization message 674 to disbursement computing device 203. Accordingly, disbursement computing device 203 receives and processes payment authorization message 674 from payor bank 604, and parses disbursement authorization identifier 668 from the corresponding data field. Disbursement computing device 203 then accesses table 670 and identifies the particular disbursement payment instruction 660 associated with the received payment authorization message 674 by locating the same disbursement authorization identifier 668 in table 670. Disbursement computing device 203 may add disbursement authorization identifier 668 to a second column (in the same row associated with the particular disbursement payment instruction 660) associated with payment authorization messages 674. Disbursement computing device 203 may additionally or alternatively add an indicator in another column (in the same row associated with the particular disbursement payment instruction) that purchase authorization request message 666 was validated by payor bank 604 (i.e., that commercial disbursement financial account 606 has sufficient funds for the disbursement). In other words, disbursement authorization identifier 668 and the corresponding data field appended to a network message permits disbursement computing device 203 to track incoming and outgoing messages associated with one particular funds disbursement payment instruction 660, no matter how many disbursement payment instructions 660 disbursement computing device 203 is handling substantially simultaneously and/or within a certain period of time.

If payor bank 604 determines that balance 610 of commercial disbursement financial account 606 is not at least equal to disbursement amount 662, payor bank 604 is configured to disregard, ignore, or otherwise not respond to funds capture instruction 672, whether funds capture instruction 672 is null or includes an automatic initiation instruction. In addition, payor bank 604 transmits a payment denial (or decline) message 676 to disbursement computing device 203. Payment denial message 676 may be transmitted through network 601, for example, formatted as a network message. Payment denial message 676 includes a data field corresponding to (and including) disbursement authorization identifier 668, which is re-transmitted in payment denial message 676 to disbursement computing device 203. Accordingly, disbursement computing device 203 receives and processes payment denial message 676 from payor bank 604, and parses disbursement authorization identifier 668 from the corresponding data field. Disbursement computing device 203 then accesses table 670 and identifies the particular disbursement payment instruction 660 associated with the received payment denial message 676 by locating the same disbursement authorization identifier 668 in table 670. Disbursement computing device 203 may add disbursement authorization identifier 668 to another column (in the same row associated with the particular disbursement payment instruction 660) associated with payment denial messages 676. Disbursement computing device 203 may additionally or alternatively add an indicator in another column (in the same row associated with the particular disbursement payment instruction 660) that purchase authorization request message 666 was denied by payor bank 604 (i.e., that commercial disbursement financial account 606 does not have sufficient funds for the disbursement).

In some embodiments, after receiving payment authorization message 674 from payor bank 604, disbursement computing device 203 transmits payment authorization message 674 (or a copy thereof) to payee bank 616. Payment authorization message 674 may be transmitted through network 601, for example, formatted as a network message. Payment authorization message 674 includes payee identifier 664 and disbursement amount 662. In some embodiments, payment authorization message 674 already includes the payee identifier data field (and, accordingly, payee identifier 664) prior to transmission of payment authorization message 674 to disbursement computing device 203. For example, payor bank 604 may append the data field including payee identifier 664 to payment authorization message 674. In other embodiments, disbursement computing device 203 appends the additional data field to payment authorization message 674, the additional data field corresponding to (and including) payee identifier 664. Disbursement computing device 203 utilizes payee identifier 664 to identify payee financial account 618 maintained at payee bank 616 (e.g., using a lookup table that maps payee identifier 664 to a PAN (not shown) of payee financial account 618), such that disbursement computing device 203 accurately routes payment authorization message 674 to payee bank 616. Additionally, payment authorization message 674 includes the data field corresponding to (and including) disbursement authorization identifier 668. Disbursement computing device may add an indicator to table 670 in another column (in the same row associated with the particular disbursement payment instruction 660) that payment authorization message 674 has been transmitted to payee bank 616.

Payee bank 616 receives and processes payment authorization message 674 to validate payee financial account 618. Payee bank 616 identifies payee financial account 618 (e.g., using payee identifier 664), and confirms that payee financial account 618 is valid and available for a funds transfer. In some embodiments, disbursement computing device 203 appends an additional data field to payment authorization message 674 prior to transmitting payment authorization message 674 to payee bank 616, the additional data field corresponding to (and including) a funds credit instruction 678. Funds credit instruction 678 may be as small as one bit occupied by a 0 or 1. A 0 may represent a "null" or no instruction 678, and a 1 may represent an automatic "action" or "initiate" instruction 678. Alternatively, funds credit instruction 678 may have any other length, format, or configuration. An automatic initiation funds credit instruction 678 triggers payee bank 616 to automatically transfer ("credit") funds in disbursement amount 662 to payee financial account 618. Accordingly, in at least some embodiments, funds equal to disbursement amount 662 are immediately available in payee financial account 618. In some embodiments, payee bank 616 may also have a settlement financial account (not shown) from which funds are drawn to be transferred to payee financial account 618.

Payee bank 616 also transmits a payment approval message 680 to disbursement computing device 203. Payment approval message 680 may be transmitted through network 601, for example, formatted as a network message. Payment approval message 680 includes an indication that payee financial account 618 is valid and that the disbursement was successfully completed. Payment approval message 680 may include the data field corresponding to (and including) disbursement authorization identifier 668. Accordingly, disbursement computing device 203 receives and processes payment approval message 680 from payee bank 616, and parses disbursement authorization identifier 668 from the corresponding data field. Disbursement computing device 203 then accesses table 670 and identifies the particular disbursement payment instruction 660 associated with the received payment approval message 680 by locating the same disbursement authorization identifier 668 in table 670. Disbursement computing device 203 may add disbursement authorization identifier 668 to another column (in the same row associated with the particular disbursement payment instruction 660) associated with payment approval messages 680. Disbursement computing device 203 may additionally or alternatively add an indicator in another column (in the same row associated with the particular disbursement payment instruction 660) that the funds transfer was successfully completed.

Disbursement computing device 203 may then transmit a notification message 682 to payee 614 (e.g., to a computing device associated with payee 614) that funds in disbursement amount 662 have been transferred to payee financial account 618. Notification message 682 may be transmitted to payee 614 using any number of communication protocols. For example, notification message 682 may be transmitted from disbursement computing device 203 to payee 614 via SMS, email, phone, a network message associated with network 601, a specific software application associated with disbursement computing device 203, and/or any other communication protocol. Alternatively or additionally, disbursement computing device 203 and/or payee bank 616 may transmit notification message 680 to payor 602 (e.g., to a computing device associated with payor 602). Alternatively or additionally, payor 602 and/or payee bank 616 may transmit notification message 680 to payee 614.

The processes described above with respect to a single disbursement payment instruction 660 apply similarly to any number of disbursement payment instructions 660 as included in disbursement message 658. In certain embodiments, a disbursement message 658 includes a batch of disbursement payment instructions 660. Disbursement computing device 203 processes each disbursement payment instruction 660 as described above, and compiles or consolidates all payment approval or denial messages 674, 676 into a single batch file 684 (e.g., as a table including indications of whether each disbursement associated with each of the plurality of disbursement payment instructions 660 was approved or denied). Disbursement computing device 203 stores batch file 684 for clearing and settlement of all the disbursements, for example, in a subsequent settlement cycle. Disbursement computing device 203 may transmit batch file 684 to payor 602, payor bank 604, payee bank 616, and/or network 601 for clearing and settlement. In one example embodiment of a settlement process, disbursement computing device 203 transmits batch file 684 (and/or any other stored approval/denial responses, e.g., additional batch and/or single-disbursement files) to payor bank 604. Payor bank 604 uses funds captured and transferred to settlement financial account 662 to settle the disbursements with one or more payee banks 616.

Figure 7:
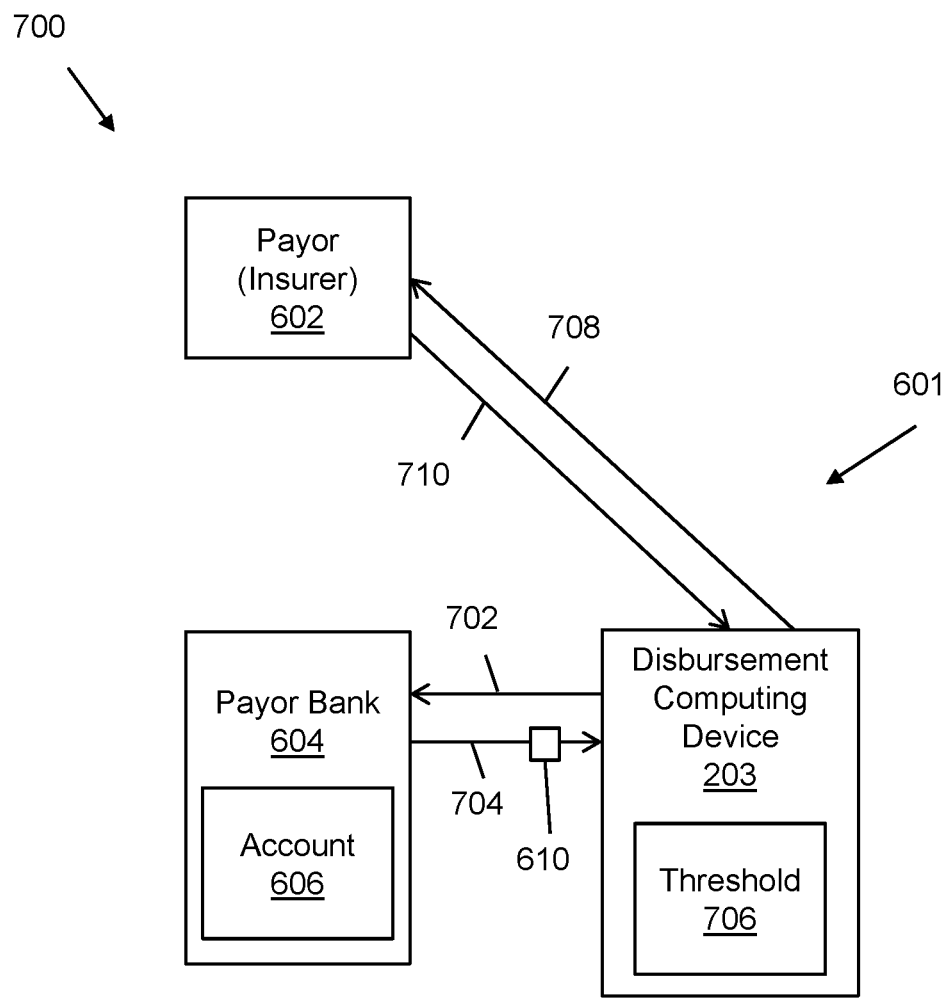

FIG. 7 is a diagram of an example balance management process 700 in accordance with the present disclosure. Disbursement computing device 203 (shown in FIG. 2) transmits a balance inquiry message 702 including an identification of commercial disbursement financial account 606 to payor bank 604 (both shown in FIG. 6). Payor bank 604 transmits a balance response message 704 to disbursement computing device 203. Balance response message 704 includes a current balance 610 (shown in FIG. 6) of commercial disbursement financial account 606. Disbursement computing device 203 compares current balance 610 to a predefined threshold amount 706 set by payor 602. Predefined threshold amount 706 represents a balance at which payor 602 would like to be notified that balance 610 is low. If current balance 610 is less than predefined threshold amount 706, disbursement computing device 203 transmits an alert message 708 to payor 602 that funds are low in commercial disbursement financial account 606 and payor 602 should transfer funds into commercial disbursement financial account 606 to replenish balance 610. Alert message 708 may be transmitted through network 601 (shown in FIG. 1), for example, as a network message. Additionally or alternatively, alert message 708 may be transmitted using another communication protocol (e.g., email). In some embodiments, payor bank 604 maintains predefined threshold amount 706 and transmit alert message 708 to payor 602 when balance 610 falls below predefined threshold amount 706.

In at least some embodiments, when payor 602 transfers additional funds into commercial disbursement financial account 606, payor 602 transmits an additional funds message 710 to disbursement computing device 203 that payor 602 has added additional funds to commercial disbursement financial account 606. Upon receiving additional funds message 710, disbursement computing device 203 transmits a new balance inquiry message 702, as described above. When disbursement computing device 203 receives a resulting new balance response message 704 through payment network 601, disbursement computing device 203 determines that the funds have been added to commercial disbursement financial account 606 and/or that balance 610 is now above predefined threshold amount 706. In some embodiments, additional funds message 710 specifies an amount of the funds added to commercial disbursement financial account 606, and disbursement computing device 203 confirms that the amount of funds specified in additional funds message 710 has, in fact, been added to commercial disbursement financial account 606. In other embodiments, additional funds message 710 does not specify the amount of funds that have been added, and disbursement computing device 203 determines the amount of funds that have been added by comparing an updated balance 610 of commercial disbursement financial account 606, as reported in the new balance response message 704, to the previous balance 610 reported in the previous balance response message 704.

In the processes described above, at least some messages are transmitted between parties through payment network 128 (shown in FIG. 1) and/or payment network 601. In other embodiments, at least one of the messages is transmitted through a different network, using an application programming interface (API), for example, provided by payor bank 604.

Figure 8:
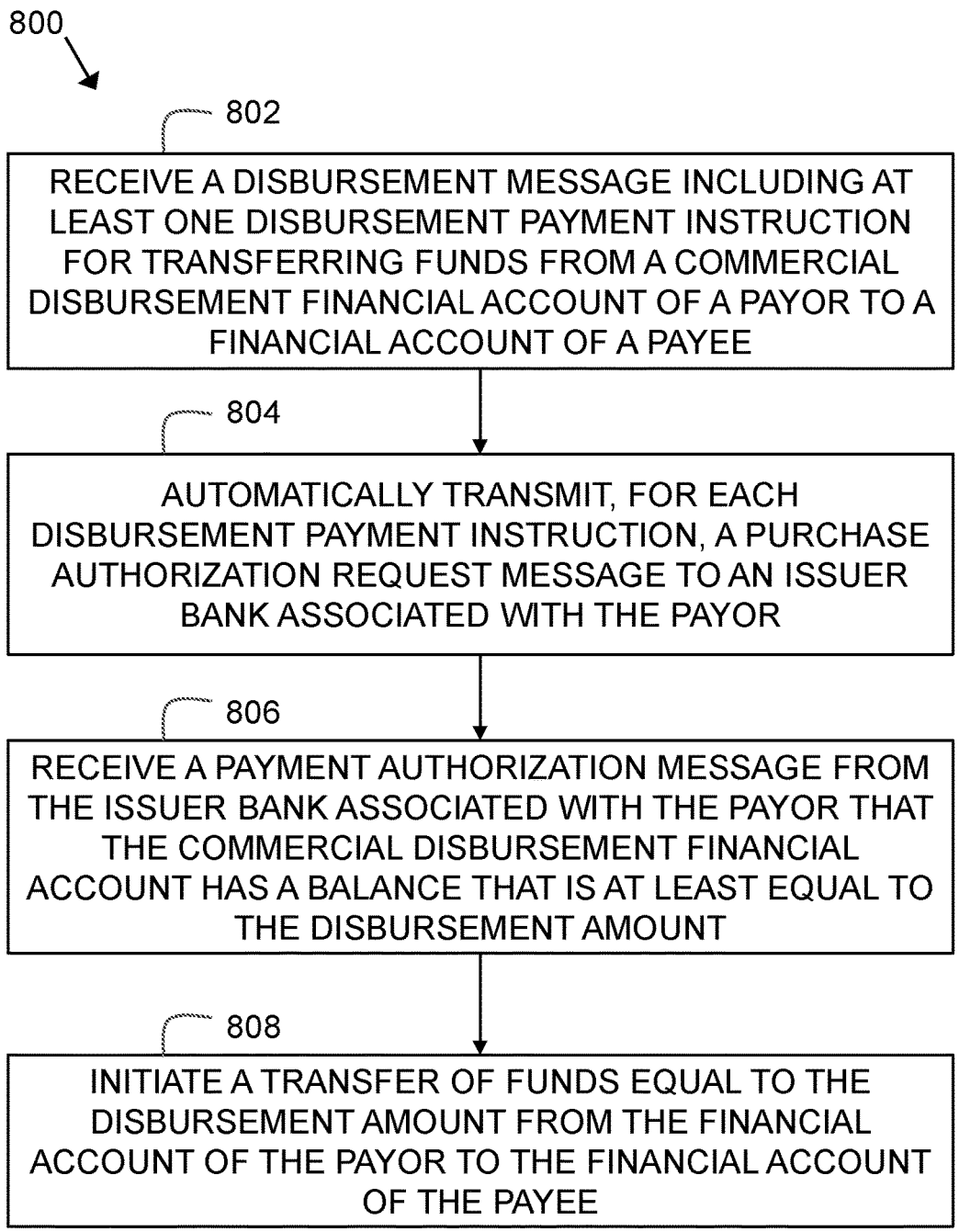

FIG. 8 is a flowchart of an example process 800 implemented by payment processing system 100 (e.g., by disbursement computing device 203, shown in FIG. 2) for processing disbursements from a commercial disbursement financial account (e.g., commercial disbursement financial account 606, shown in FIG. 6). As described above with respect to FIG. 6, disbursement computing device 203 is operated by disbursement service provider 603 (shown in FIG. 6), which may be, for example, payor bank 604 (also shown in FIG. 6), a sponsor bank or acquirer, an operator of payment network 128 (shown in FIG. 1) and/or payment network 601 (shown in FIG. 6) on behalf of a sponsor bank or acquirer, or another entity, depending on the implementation thereof.

In the illustrated embodiment, process 800 includes receiving 802 a disbursement message (e.g., disbursement message 658). The disbursement message includes at least one disbursement payment instruction (e.g., payment instruction 660) for transferring funds from the commercial disbursement financial account of a payor (e.g., payor 602) to a financial account (e.g., payee account 618) of a payee (e.g., payee 614). Moreover, each disbursement payment instruction includes at least a payor identifier (e.g., payor identifier 612), a payee identifier (e.g., payee identifier 664), and a disbursement amount (e.g., disbursement amount 662, all shown in FIG. 6).

In the example embodiment, as described elsewhere herein, receiving 802 the disbursement message causes disbursement computing device 203 to automatically transmit 804, for each disbursement payment instruction, a purchase authorization request message (e.g., purchase authorization request message 666) to an issuer bank (e.g., payor bank 604) associated with the payor. The purchase authorization request message includes at least the disbursement amount. Process 800 further includes receiving 806 a payment authorization message (e.g., payment authorization message 674) from the issuer bank associated with the payor that the commercial disbursement financial account has a balance (e.g., balance 610) that is at least equal to the disbursement amount. Process 800 also includes initiating 808 a transfer of funds (e.g., funds 620) equal to the disbursement amount from the financial account of the payor to the financial account of the payee. In some embodiments, initiating 808 includes initiating a debit of funds from the financial account of the payor to a settlement financial account (e.g., settlement financial account 622, all shown in FIG. 6) at the issuer bank associated with the payor. Initiating 808 may additionally include initiating a credit of funds to the financial account of the payee (e.g., from a settlement financial account at the bank associated with the payee). IT should be understood that disbursement computing device 203 performs steps 804 through 808 for each payment instruction included in the received disbursement message. Moreover, it should be understood that process 800 may include additional and/or alternative steps, including those described elsewhere herein, such as, but not limited to, registration steps and/or settlement steps.

Figure 9:
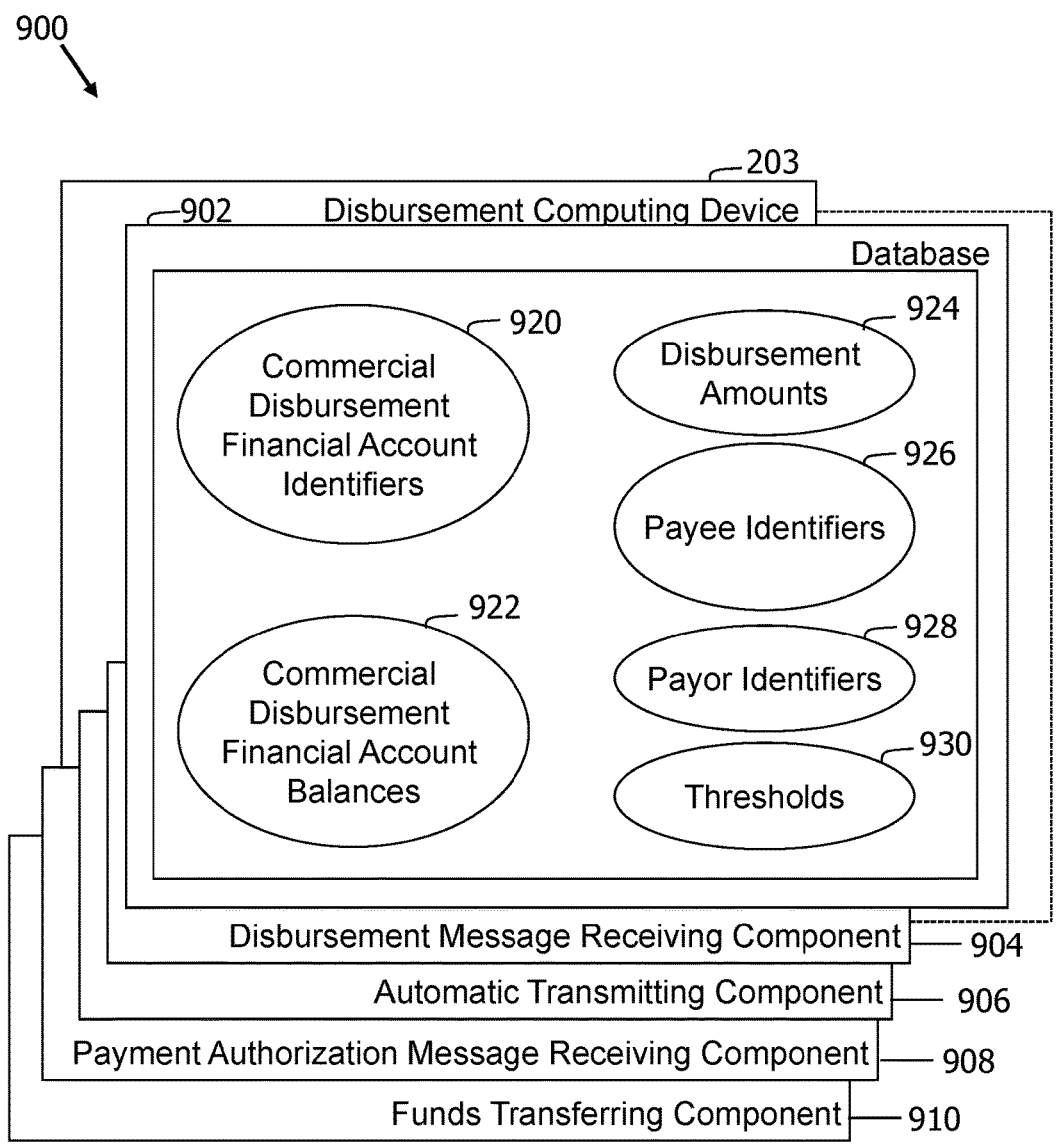

FIG. 9 is a diagram 900 of components of one or more example computing devices, for example, disbursement computing device 203, that may be used in embodiments of the described systems and methods. FIG. 9 further shows a configuration of a database 902, which may be similar to database 208 (shown in FIG. 2). Database 902 is configured to store a variety of information, including, for example, commercial disbursement financial account identifiers 920 (e.g., PANs), commercial disbursement financial account balances 922, disbursement amounts 924, payee identifiers 926, payor identifiers 928, and/or thresholds 930. It should be understood that database 902 may hold additional, alternative, and/or less information, in various embodiments. Information may be stored in sections within database 902, wherein these sections are interconnected to retrieve and store information in accordance with the functions and processes described herein. Database 902 is in communication with several separate components within disbursement computing device 203, which perform specific tasks.

Disbursement computing device 203 includes a disbursement message receiving component 604 configured to receive a disbursement message including at least one disbursement payment instruction for transferring funds from a commercial disbursement financial account of a payor to a financial account of a payee. Each disbursement payment instruction includes a payor identifier 928, a payee identifier 926, and a disbursement amount 924. Disbursement computing device 203 also includes an automatic transmission component 906. The receive disbursement message is configured to trigger the automatic transmission component 906 to automatically transmit, for each disbursement payment instruction, a purchase authorization request message to an issuer bank associated with the payor. The purchase authorization request message includes the disbursement amount 924.

Disbursement computing device 203 further includes a payment authorization message receiving component 908 configured to receive a payment authorization message from the issuer bank associated with the payor that the commercial disbursement financial account has a balance 922 that is at least equal to the disbursement amount 924. It should be understood that receiving components 904 and 908 may be implemented as a single component or as two separate components. Disbursement computing device 203 also includes a funds transferring component 910 configured to initiate a transfer of funds equal to the disbursement amount 924 from the financial account of the payor to the financial account of the payee.

Disbursement computing device 203 may include additional and/or alternative components to those illustrated in FIG. 9. For example, disbursement computing device 203 may include components for receiving and/or transmitting other messages or data files (e.g., associated with registration or settlement), for generating and/or transmitting alerts (e.g., an alert when a balance 922 falls below a threshold 930), other generating components, processing components, data file manipulation components, and/or any other components for performing steps as described elsewhere herein.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described embodiments of a method and system for transmitting disbursements from a commercial financial account enable real-time disbursements from a payor to a payee. More specifically, the methods and systems enable larger amounts of funds and/or greater number of disbursements to be transferred from a payor's financial account to a payee's financial account with instant credit to the payee (the beneficiary). The account balance verification processes implemented by the method and system described herein enables banks to control the flow of disbursements and ensure that the payor has sufficient funds to cover the disbursements. Additionally, communication takes place through a payment network used for processing multiple types of payment transactions, including credit card transactions, rather than requiring parties to utilize multiple different communication API's to communicate with each other. Additionally, by automating the transfer of funds as described herein, the method and system ensures always having sufficient funds in the payor's account without requiring parties to perform any manual verification of account balances.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A disbursement computing device for transmitting disbursements in real time from a payor to a plurality of payees through a payment processing network, said disbursement computing device is in communication with a payment processing server computing device, the payment processing server computing device in communication with the payment processing network, the payment processing network including a payor device associated with the payor and a payee device associated with each payee, said disbursement computing device comprising a processor communicatively coupled to a memory, said processor configured to:

receive, from the payor device, a disbursement message including a plurality of disbursement payment instructions, each of the plurality of disbursement payment instructions for transferring funds from a commercial disbursement financial account of the payor to a financial account of a respective payee, each disbursement payment instruction including a payor identifier, a payee identifier, and a disbursement amount;

automatically generate, for each disbursement payment instruction, a purchase authorization request message that includes the disbursement amount and a disbursement authorization identifier, wherein the disbursement authorization identifier associates each purchase authorization request message with a corresponding disbursement payment instruction;

generate a table associating each disbursement authorization identifier with a corresponding disbursement payment instruction;

automatically transmit, for each disbursement payment instruction, the corresponding purchase authorization request message to the payment processing server computing device for transmission through the payment processing network to an issuer bank associated with the payor;

receive, from the issuer bank associated with the payor, a plurality of payment authorization messages, each payment authorization message associated with a corresponding purchase authorization request message, wherein each payment authorization message (i) indicates whether the commercial disbursement financial account has a balance that covers the corresponding disbursement amount, and (ii) includes the corresponding disbursement authorization identifier;

store, in the table, a validation indicator for each payment authorization message indicating the commercial disbursement financial account has sufficient funds to cover the corresponding disbursement amount, the validation indicator indicating that the corresponding purchase authorization request message was validated by the issuer bank, wherein the validation indicator is associated with the corresponding disbursement payment instruction; and initiate, through the payment processing server computing device, for each validated payment authorization message, a transfer of funds equal to the corresponding disbursement amount from the financial account of the payor to the corresponding financial account of the payee.

2. The disbursement computing device of claim 1 further configured to:

receive a registration request message from the issuer bank associated with the payor, the registration request message including a primary account number of the financial account associated of the payor; and assign the payor identifier to the primary account number.

3. The disbursement computing device of claim 1 further configured to transmit each validated payment authorization message to a payee bank associated with the payee for that validated payment authorization message.

4. The disbursement computing device of claim 3 further configured to receive a payment approval message from the payee bank indicating that the financial account of the payee is valid.

5. The disbursement computing device of claim 1 further configured to, for at least one validated payment authorization message, transmit a notification message to the payee that funds in the disbursement amount have been transferred to the financial account of the payee.

6. The disbursement computing device of claim 1, wherein the disbursement computing device is further configured to:

consolidate purchase approval requests and denials associated with each of the plurality of disbursement payment instructions in a data file; and transmit the data file to the issuer bank associated with the payor for settlement.

7. The disbursement computing device of claim 1 further configured to:

initiate, for each transfer of funds, a debit of funds in the corresponding disbursement amount from the financial account of the payor to a settlement financial account at the issuer bank associated with the payor; and initiate, for each transfer of funds, a credit of funds in the corresponding disbursement amount to the corresponding financial account of the corresponding payee.

8. A method for transmitting disbursements in real time from a payor to a plurality of payees through a payment processing network, the method is implemented by a disbursement computing device in communication with a payment processing server computing device, the payment processing server computing device in communication with a payment processing network, the payment processing network including a payor device associated with the payor and a payee device associated with the payee, the disbursement computing device includes one or more processors in communication with a memory, said method comprising:

receiving from the payor device, a disbursement message including a plurality of disbursement payment instructions, each of the plurality of disbursement payment instructions for transferring funds from a commercial disbursement financial account of the payor to a financial account of a respective payee, each disbursement payment instruction including a payor identifier, a payee identifier, and a disbursement amount;

automatically generating, for each disbursement payment instruction, a purchase authorization request message that includes the disbursement amount and a disbursement authorization identifier, wherein the disbursement authorization identifier associates each purchase authorization request message with a corresponding disbursement payment instruction;

generating a table associating each disbursement authorization identifier with a corresponding disbursement payment instruction;

automatically transmitting, for each disbursement payment instruction, the corresponding purchase authorization request message to the payment processing server computing device for transmission through the payment processing network to an issuer bank associated with the payor;

receiving, from the issuer bank associated with the payor, a plurality of payment authorization messages, each payment authorization message associated with a corresponding purchase authorization request message, wherein each payment authorization message (i) indicates whether the commercial disbursement financial account has a balance that covers the corresponding disbursement amount, and (ii) includes the corresponding disbursement authorization identifier;

storing, in the table, a validation indicator for each payment authorization message indicating the commercial disbursement financial account has sufficient funds to cover the corresponding disbursement amount, the validation indicator indicating that the corresponding purchase authorization request message was validated by the issuer bank, wherein the validation indicator is associated with the corresponding disbursement payment instruction; and initiating through the payment processing server computing device, for each validated payment authorization message, a transfer of funds equal to the corresponding disbursement amount from the financial account of the payor to the corresponding financial account of the payee.

9. The method of claim 8 further comprising:

receiving a registration request message from the issuer bank associated with the payor, the registration request message including a primary account number of the financial account associated of the payor; and assigning the payor identifier to the primary account number.

10. The method of claim 9 further comprising transmitting each validated payment authorization message to a payee bank associated with the payee for that payment authorization message.

11. The method of claim 10 further comprising receiving a payment approval message from the payee bank indicating that the financial account of the payee is valid.

12. The method of claim 8 further comprising transmitting, for at least one validated payment authorization message, a notification message to the payee that funds in the disbursement amount have been transferred to the financial account of the payee.

13. The method of claim 8, further comprising:

consolidating purchase approval requests and denials associated with each of the plurality of disbursement payment instructions in a data file; and transmitting the data file to the issuer bank associated with the payor for settlement.

14. The method of claim 8, wherein initiating a transfer of funds equal to the disbursement amount from the financial account of the payor to the financial account of the payee comprises:
  initiating, for each transfer of funds, a debit of funds in the corresponding disbursement amount from the financial account of the payor to a settlement financial account at the issuer bank associated with the payor; and
  initiating for each transfer of funds, a credit of funds in the corresponding disbursement amount to the corresponding financial account of the corresponding payee.

15. A non-transitory computer-readable storage medium having computer-executable instructions embodied thereon for transmitting disbursements in real time from a payor to a plurality of payees through a payment processing network, wherein when executed by a disbursement computing device coupled to a payment processing server computing device in communication with the payment network, the payment network including a payor device associated with the payor and a payee device associated with a respective payee, the disbursement computing device having at least one processor coupled to a memory, the computer-executable instructions cause the disbursement computing device to:
  receive, from the payor device, a disbursement message including a plurality of disbursement payment instructions, each of the plurality of disbursement payment instructions for transferring funds from a commercial disbursement financial account of the payor to a financial account of a respective payee, each disbursement payment instruction including a payor identifier, a payee identifier, and a disbursement amount;
  automatically generate, for each disbursement payment instruction, a purchase authorization request message that includes the disbursement amount and a disbursement authorization identifier, wherein the disbursement authorization identifier associates each purchase authorization request message with a corresponding disbursement payment instruction;
  generate a table associating each disbursement authorization identifier with a corresponding disbursement payment instruction;
  automatically transmit, for each disbursement payment instruction, the corresponding purchase authorization request message to the payment processing server computing device for transmission through the payment processing network to an issuer bank associated with the payor;
  receive, from the issuer bank associated with the payor, a plurality of payment authorization messages, each payment authorization message associated with a corresponding purchase authorization request message, wherein each payment authorization message (i) indicates whether the commercial disbursement financial account has a balance that covers the corresponding disbursement amount, and (ii) includes the corresponding disbursement authorization identifier;
  store, in the table, a validation indicator for each payment authorization message indicating the commercial disbursement financial account has sufficient funds to cover the corresponding disbursement amount, the validation indicator indicating that the corresponding purchase authorization request message was validated by the issuer bank, wherein the validation indicator is associated with the corresponding disbursement payment instruction; and
  initiate, through the payment processing server computing device, for each validated payment authorization message, a transfer of funds equal to the corresponding disbursement amount from the financial account of the payor to the corresponding financial account of the payee.

16. The non-transitory computer-readable storage medium of claim 15, wherein the computer-executable instructions further cause the disbursement computing device to:
  receive a registration request message from the issuer bank associated with the payor, the registration request message including a primary account number of the financial account associated of the payor; and
  assign the payor identifier to the primary account number.

17. The non-transitory computer-readable storage medium of claim 15, wherein the computer-executable instructions further cause the disbursement computing device to:
  transmit each validated payment authorization message to a payee bank associated with the payee for that validated payment authorization message; and
  receive a payment approval message from the payee bank indicating that the financial account of the payee is valid.

18. The non-transitory computer-readable storage medium of claim 15, wherein the computer-executable instructions further cause the disbursement computing device to transmit, for at least one validated payment authorization message, a notification message to the payee that funds in the disbursement amount have been transferred to the financial account of the payee.

19. The non-transitory computer-readable storage medium of claim 15, wherein the computer-executable instructions further cause the disbursement computing device to:
  consolidate purchase approval requests and denials associated with each of the plurality of disbursement payment instructions in a data file; and
  transmit the data file to the issuer bank associated with the payor for settlement.

20. The non-transitory computer-readable storage medium of claim 15, wherein the computer-executable instructions further cause the disbursement computing device to:
  initiate, for each transfer of funds, a debit of funds in the corresponding disbursement amount from the financial account of the payor to a settlement financial account at the issuer bank associated with the payor; and
  initiate, for each transfer of funds, a credit of funds in the corresponding disbursement amount to the corresponding financial account of the corresponding payee.

* * * * *